UNITED STATES PATENT OFFICE.

ISAAC LICHTENTAG, OF NEW ORLEANS, LOUISIANA.

CEMENT.

SPECIFICATION forming part of Letters Patent No. 363,402, dated May 24, 1887.

Application filed February 15, 1887. Serial No. 227,740. (No specimens.)

*To all whom it may concern:*

Be it known that I, ISAAC LICHTENTAG, a citizen of the United States, residing at New Orleans, in the parish of Orleans and State of Louisiana, have invented a new and Improved Cement, of which the following is a full, clear, and exact description.

The object of my invention is to furnish a new and improved cement for building purposes.

My cement is composed of the following ingredients, combined in the proportions stated: unslaked lime, two hundred parts, by measure; kainit, twenty parts, by measure; acetate of lime, five parts, by measure; river or any other fine sand, three times the quantity of the lime. These ingredients are heaped up in a pile, and sufficient water added to turn the lime into a dry hydrate. The mass is then thoroughly mixed and sifted, after which it is ready to be barreled up and sold, to be used in the same manner as other cement. The kainit is a natural product which contains sulphate of potassa, sulphate of magnesia, and other salts, which, together with the acetate of lime, I have found have a great attraction for caustic lime, and give to it hardening properties.

I do not confine myself strictly to the proportions given, as the richer the lime the more kainit and acetate of lime is required.

What I claim, and desire to secure by Letters Patent of the United States, is—

The herein-described cement, composed of lime, kainit, acetate of lime, and river or any other fine sand, substantially as set forth.

ISAAC LICHTENTAG.

Witnesses:
MARTIN E. DORIOCOURT,
CHARLES RUISSER.